Aug. 16, 1938.　　　　P. L. BRATTAIN　　　　2,127,387
SELF LOCKING BUMPER COUPLING
Filed May 23, 1938
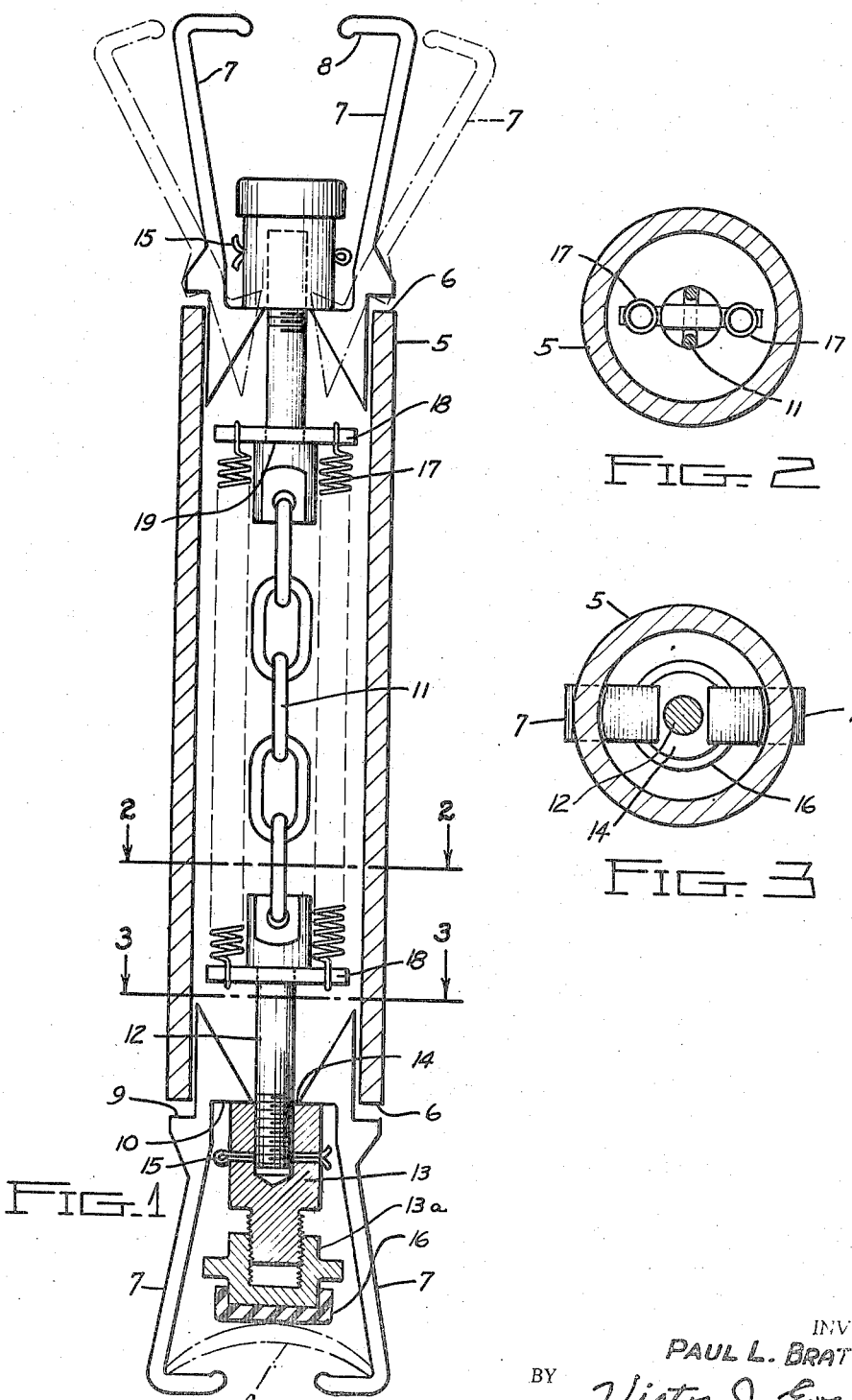
INVENTOR.
PAUL L. BRATTAIN
BY Victor J. Evans & Co.
ATTORNEY.

Patented Aug. 16, 1938

2,127,387

UNITED STATES PATENT OFFICE 2,127,387

SELF-LOCKING BUMPER COUPLING

Paul L. Brattain, Azusa, Calif.

Application May 23, 1938, Serial No. 209,584

3 Claims. (Cl. 280—33.14)

This invention relates to couplings and more particularly to a self-locking bumper coupling.

An object of the invention is to provide a simple, practical and inexpensive coupling of the character described. Another object is to provide an improved type of self-locking coupling intended primarily for locking motor vehicles by engagement with the bumpers thereof, although not limited to that particular type of vehicle but having general coupling use. A further object is to provide a coupling of the character described adapted for pushing as well as pulling.

Other objects and advantages will appear and be brought out more fully in the following specification, reference being had to the accompanying drawing, wherein Fig. 1 is a section view of a coupling embodying my invention and Fig. 2 is a section view taken along the line 2—2 of Fig. 1 and Fig. 3 is a similar sectional view taken along the line 3—3 of Fig. 1.

Referring more particularly to the drawing, I show a coupling comprising a rigid member 5 which in the embodiment shown is tubular, such as a section of a pipe, having abutment end portions 6 at each end for cooperation with a pair of hook members 7, each of which has a terminal hook 8 and abutments 9 and 10. A chain 11 is retained within tube 5 by being secured at each end to a stud bolt 12 to which is secured cap nut 13 having a seat portion 14 adapted for engagement with abutments 10 or members 7. Nut 13 is suitably locked to bolt 12 by cotter pin 15 or in any other suitable manner. An adjustable nut 13a may be screw threaded to nut 13 so as to form a tight fit between cap 16 and the bumper A. A resilient cap 16 for each nut 13 may be provided as desired. A pair of tension springs 17 are secured to the opposite ends of a pair of shoulder blocks 18 which are held against shoulders 19 or bolts 12.

The operation of my invention should be apparent from the foregoing description. The hooks 7 are suitably secured to a bumper A and if tension is applied between the bumpers, it will be clear that the tension would be transmitted through shoulders 10 and abutments 14 to bolts 12 and chain 11. This action will result in the hooks 7 being held tightly to the bumper A. The action of the springs 17 being such as to draw the bolts 12 toward each other and thus keep the gripping effect of hooks 7 on the bumpers. If it is desired to push one of the vehicles instead of pulling it, the effect will be the same. Pressure applied against cap nuts 13 will be transmitted to seats 14 and shoulders 10, 9 and 6 and the hooks 7 will again be held tightly to the bumpers by the pivoting action thereof as will be apparent. It will therefore be obvious that the hereinabove objects have been achieved by my invention.

Having described my invention, what I claim is:

1. A self-locking coupling as described comprising an elongated rigid member having shoulders adjacent the ends thereof, a pair of hook members having abutments adapted to engage said shoulders and having additional abutments, a pair of stud pins having means to engage said additional abutments and link means interconnecting said pins.

2. A self-locking coupling as described comprising an elongated rigid member having shoulders adjacent the ends thereof, a pair of hook members having abutments adapted to engage said shoulders and having additional abutments, a pair of stud pins having means to engage said additional abutments, link means interconnecting said pins, and tension spring means interconnecting said pins.

3. A self-locking coupling as described comprising an elongated rigid member having shoulders adjacent the ends thereof, a pair of hook members having abutments adapted to engage said shoulders and having additional abutments, a pair of stud pins having means to engage said additional abutments and link means interconnecting said pins, said pins adapted to receive and transmit a compression thrust.

PAUL L. BRATTAIN.